June 3, 1924.  
G. HILGER  
GEARING  
Filed Nov. 12, 1921  
1,496,120
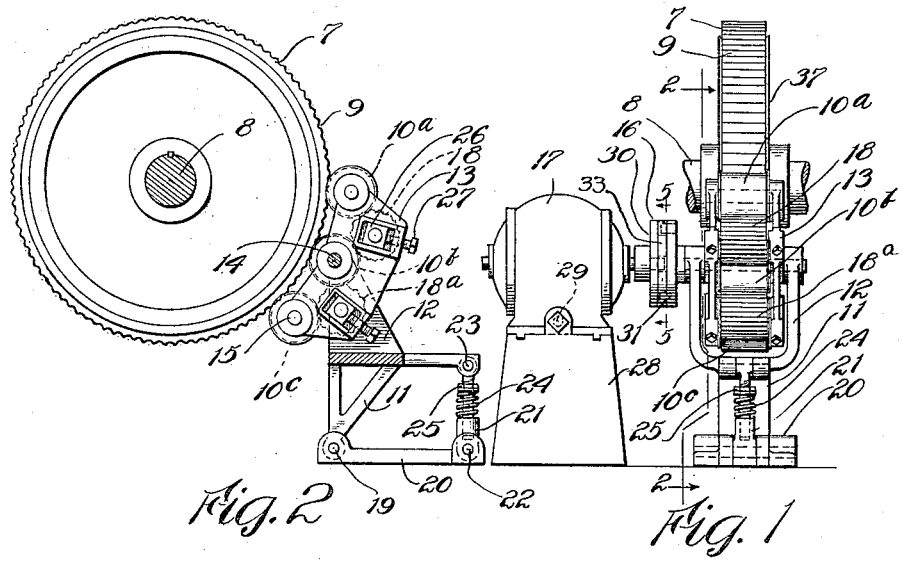
Fig. 2   Fig. 1
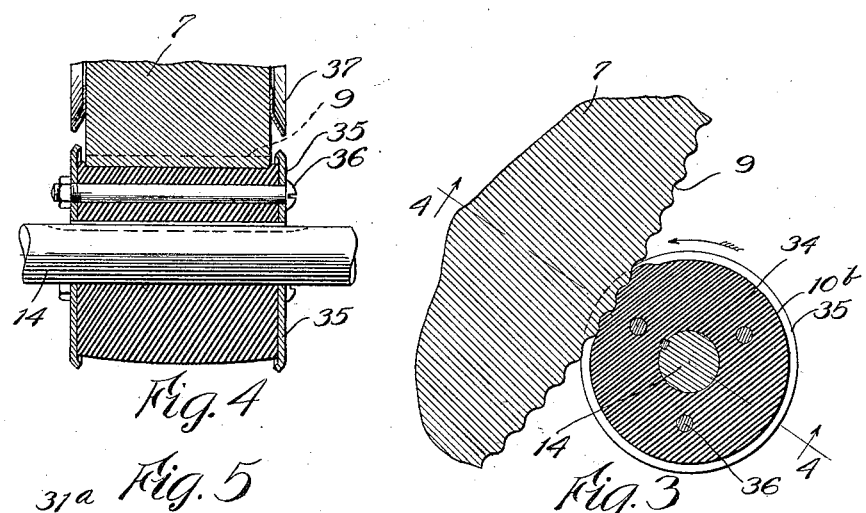
Fig. 4  
Fig. 5  
Fig. 3
Inventor  
George Hilger  
By Miller Chindahl & Parker  
Attys Patented June 3, 1924.

1,496,120

UNITED STATES PATENT OFFICE.

GEORGE HILGER, OF CHICAGO, ILLINOIS.

GEARING.

Application filed November 12, 1921. Serial No. 514,464.

*To all whom it may concern:*

Be it known that I, GEORGE HILGER, a citizen of the United States, residing at Chicago, in the county of Cook and State of Illinois, have invented certain new and useful Improvements in Gearing, of which the following is a specification.

The invention relates to an improved gearing embodying interengaging driving and driven elements; and the aim of the invention is to produce an efficient driving means which is substantially noiseless in operation.

With this aim in view, one object of the invention is to provide a gearing, one of the coacting elements of which is made of a yielding or impressionable material such as soft rubber placed under tension so as to be capable of interengaging with the other element to effect a substantially positive driving connection therebetween.

A further object of the invention is to provide a gear element of this character having means whereby the degree of resiliency or tension of the rubber may be varied.

Another object of the invention is to provide means of an advantageous character for holding the elements of the gearing in operative engagement.

Still another object is to provide a connection between a power shaft and the driving element to permit of the movement of the latter with respect to the driven element.

The objects of the invention thus generally stated, together with other and ancillary advantages, may be attained by the construction and arrangement illustrated in the accompanying drawings forming part hereof, wherein I have illustrated one embodiment of the invention. It will be understood, however, that various changes in form, construction and arrangement of the parts may be made by those skilled in the art without departing from the spirit and scope of the invention as expressed in the appended claims.

In Figure 1 of the drawings, I have shown an end elevation of my improved gearing, with the driven element connected to an electric motor constituting the source of power. Fig. 2 is a vertical sectional view taken in the plane of line 2—2 of Fig. 1. Fig. 3 is an enlarged detail sectional view illustrating the interengagement of the two elements. Fig. 4 is a sectional view taken in the plane of line 4—4 of Fig. 3. Fig. 5 is a sectional view taken in the plane of line 5—5 of Fig. 1.

It will be apparent that my improved gearing is adapted for many and varied uses. Herein the invention is illustrated in connection with the driving mechanism for a refrigerating plant of the type adapted for domestic use. Thus, 7 designates a gear wheel or disk rigidly mounted upon a shaft 8. The wheel 7 constitutes the driven element. It is made of a hard and non-yielding material, such as metal and is provided with a roughened periphery 9 herein corrugated to form rounded teeth and depressions or indentations. Obviously many suitable shapes for such surface may be employed.

The drive element may consist of one or more gears or pinions adapted for engagement with the periphery of the wheel 7. Herein, I have shown three such pinions designated respectively $10^a$, $10^b$ and $10^c$. Each of these pinions is made of a relatively soft and yielding material such as soft rubber, and is mounted so as to be forced into engagement with the corrugated surface of the wheel as shown more clearly in Fig. 3 with their axes positioned substantially equidistant from the periphery of wheel 7. By thus forcing the pinions into engagement with the projections or teeth upon the periphery of the driven wheel 7, the effect is to form complementary or interfitting teeth or projections upon the periphery of the pinions, thus providing a driving connection therebetween.

The means for removably supporting the driving element, consisting of the pinions $10^a$, $10^b$ and $10^c$, herein comprises a pivoted support 11 having formed thereon a U-shaped frame 12 which carries between its opposite arms a pair of spaced plates 13 mounted upon a shaft 14 and carrying stud shafts 15 upon opposite sides thereof. The pinions $10^a$ and $10^c$ are mounted upon the stud shafts 15, and the pinion $10^b$ is keyed upon the shaft 14. The latter is mounted in the frame 12 and is connected by means of a flexible coupling 16 with the shaft of a motor 17 or other suitable source of power. The pinions $10^a$ and $10^c$ are driven by the pinion $10^b$ by means of idlers 18 and $18^a$ also mounted upon the plates 13 and having indented or corrugated surfaces providing teeth coacting with the pinions to form interengaging teeth thereon in a manner similar to the coaction of the pinions with the driven wheel 7.

The supporting frame 11 is pivotally mounted at 19 upon a base 20, and acting between the frame and the base is a means adapted to force the pinions with a firm pressure into engagement with the periphery of the driven wheel 7. This means comprises an extensible link connection 21 pivoted at 22 and 23 to the base and frame respectively and having a coiled compression spring 24 bearing between the lower section of the link and nuts 25 upon the upper section of the link. It will be observed that by adjusting the nuts 25 the desired degree of pressure of the pinions upon the driven element may be obtained.

For the purpose of adjusting the pressure of the idlers 18 and 18$^a$ upon the pinions, these are mounted in movable bearings 26 slidably mounted in the plates 13, and adjusting screws 27 are provided in the plates adapted to engage these bearings to force the same and hence the idlers toward the peripheries of the adjacent pinions. The plates 13 are loose upon the shaft 14 so that the various pinions of the driving unit automatically are adjusted to the periphery of the driven wheel.

The motor 17 is mounted upon a base 28 having a slideway at its upper surface upon which the motor is adjustable through the medium of a suitable feed screw 29 in a well known manner. The flexible coupling 12 is also of well known construction, comprising a pair of disks 30 and 31 each carrying a plurality of pins 30$^a$ and 31$^a$ projecting from their faces and engaging in enlarged apertures 32 in an intermediate rubber disk 33.

By this construction the motor, after the preliminary adjustment, remains stationary, the flexible coupling permitting of the relatively slight movement of the driving unit with respect to the driven unit in the operation of the gearing, while the self-alignment of the motor shaft with respect to the shaft 14 is made possible thus permitting of the efficient operation of the motor.

Preferably, the drive pinions are constructed so as to be capable of adjustment to vary the tension or resisting quality of the rubber. Herein each of these pinions comprises a central cylindrical body portion 34 formed of relatively soft but highly resilient rubber, and a pair of end plates 35 of slightly greater diameter than the body portion, the parts being clamped together by means of a plurality of bolts 36. It will be observed that by tightening the bolts 36, the rubber body of the pinion is compressed so that it is rendered less yielding, and hence its engagement with the corrugated periphery of the other gear element more positive. A further result in this adjustment of the pinions is a slight variation in the speed ratio. This is due to the fact that as the rubber body is compressed the diameter thereof increases to a greater or less extent.

In order to shield or protect the rubber bodies of the pinions from oil and other injurious substances, I provide on opposite sides of the wheel 7, a pair of guard rings 37 extending outwardly from the face of the wheel 7 toward the periphery thereof and overhanging the peripheries of the end plates 35 of the pinions. The latter are preferably bent inwardly at their edges for this purpose.

In case only one pinion is employed, it is preferably located with respect to the driven element substantially in the position occupied by the pinion 10$^b$. As shown in Fig. 3, with this arrangement, the rubber of the body portion tends to build up or pile upon the upper side of the pinion at the point of its engagement with the wheel 7. This piling up of rubber serves to increase the effectiveness of the interengagement between the two elements. On the other hand, as the pinion becomes disengaged from the driven element, the rubber exerts a pulling effect thereon which is also desirable.

While I have herein shown a driving element as consisting of a plurality of pinions, it will be apparent that one or more may be employed as may be found necessary or desirable. The construction of the latter is exceedingly simple and hence their cost of manufacture is relatively cheap. Obviously, when the rubber becomes worn or deteriorates, its tension may be increased, and ultimately, when beyond such repair, the rubber bodies may be replaced at a very low cost.

I have produced a type of gearing which is of a decidedly advantageous character, especially because of the fact that it will operate with substantially no noise, while at the same time it is more efficient than belt and other frictional drives, by reason of its positive character.

I claim as my invention:

1. A gearing comprising a driven wheel having its flange formed of hard unyielding material with contiguous convolutions formed thereon, a plurality of driving wheels having a main body portion formed of yielding tenacious material of a radial thickness substantially greater than the height of said convolutions, a member on which said driving wheels are rotatably mounted with their axes in fixed relation, toothed wheels mounted on said member to operatively engage the flanges of adjacent driving wheels by embedding their teeth therein to form a series of conjugate impermanent meshing teeth, means for holding said driving wheels in close peripheral contact with said driven wheels, the axes of said driving wheels being parallel to and positioned substantially circumferentially about the axis of the driven wheel whereby the flanges of said driving wheels are indented by said convolutions to form therewith a series of impermanent conjugate gear teeth in each of said driving wheels as said wheels rotate.

2. A gearing comprising a driven wheel having its flange formed of hard unyielding material with contiguous convolutions formed thereon, a plurality of driving wheels having their main body portion formed of yielding tenacious material of a radial thickness substantially greater than the height of said convolutions, a member on which said driving wheels are rotatably mounted with their axes in fixed relation, toothed wheels adjustably mounted on said member, means for forcing said toothed wheels into contact with the adjacent driving wheels whereby said toothed wheels are indented in the yielding material of said driving wheels to form therewith a series of impermanent conjugate meshing teeth, the axes of said driving wheels being parallel to and positioned substantially circumferentially about the axis of the driven wheel whereby the flanges of said driving wheels are indented by said convolutions to form therewith a series of impermanent conjugate gear teeth in each of said driving wheels as said wheels rotate.

3. The combination of a gear to be driven, driving pinions, a pivotal support upon which said pinions are mounted, idlers between said pinions, and means for driving one of said pinions, said driven gear and said idlers being made of relatively hard material and having depressions in their peripheries, and said pinions being made of relatively soft resilient material.

4. A gearing comprising a pair of coacting gear elements one of which is made of rubber, and means upon the other element for deflecting oil and the like from the rubber element.

5. A gearing comprising two rotatable gear elements mounted on parallel axes, one of said elements being formed of hard and unyielding material and having its peripheral surface formed with contiguous elevations and depressions, and the other of said elements comprising a main body portion formed of a relatively soft and yielding material, such as rubber, a pair of plates one upon each side of said body portion, means extending through the body portion and connecting said plates together, said means being adapted to vary the distance between the plates whereby to increase or decrease the tension of the said yielding material; and means for holding said elements with their peripheries in intimate engagement whereby the elevations and depressions in one of the elements form complementary depressions and elevations in the yielding material of the other one of the elements.

In testimony whereof, I have hereunto set my hand.

GEORGE HILGER.